(12) United States Patent
Suan

(10) Patent No.: US 7,606,585 B2
(45) Date of Patent: Oct. 20, 2009

(54) SYSTEM AND METHOD OF COMMANDING A MOBILE PHONE REMOTELY

(75) Inventor: Ngiap Meng Suan, Singapore (SG)

(73) Assignee: Nanyang Polytechnic, Singapore (SG)

( * ) Notice: Subject to any disclaimer, the term of this patent is extended or adjusted under 35 U.S.C. 154(b) by 709 days.

(21) Appl. No.: 11/100,406

(22) Filed: Apr. 7, 2005

(65) Prior Publication Data

US 2005/0265237 A1    Dec. 1, 2005

(30) Foreign Application Priority Data

Jun. 1, 2004    (SG) .............................. 2004030979

(51) Int. Cl.
*H04L 12/26* (2006.01)
(52) U.S. Cl. ...................... 455/466; 455/417
(58) Field of Classification Search ................ 370/236, 370/352, 376, 466; 455/417, 419, 425, 445, 455/466
See application file for complete search history.

(56) References Cited

U.S. PATENT DOCUMENTS

| 2001/0011016 A1* | 8/2001 | Chambers | 455/417 |
| 2005/0026620 A1* | 2/2005 | Holguin | 455/445 |
| 2005/0186969 A1* | 8/2005 | Lohtia | 455/456.3 |

* cited by examiner

*Primary Examiner*—Sam Bhattacharya
(74) *Attorney, Agent, or Firm*—Lawrence Y D Ho & Associates Pte Ltd

(57) ABSTRACT

The present invention provides a method for remotely directing a mobile phone to divert a phone call or a short message directed to the mobile phone to a designated recipient. The method comprises the following step of: sending a commanding message to the mobile phone, wherein the mobile phone has a registered remote command program with an algorithm that enables the mobile phone to receive and process the commanding message; and wherein the commanding message has a command executable by the remote command program; thereby the mobile phone will divert any phone call or short message for the mobile phone to the designated recipient.

7 Claims, 1 Drawing Sheet

SYSTEM AND METHOD OF COMMANDING A MOBILE PHONE REMOTELY

FIELD OF THE INVENTION

The present invention generally relates to call diversion, and more particularly to a system and method of commanding a mobile phone remotely.

BACKGROUND OF THE INVENTION

Mobile phone is becoming a daily commodity for most of people. It is transforming our lives by providing real time communications without boundaries. It offers efficiency and convenience to mobile phone users. However, the users often could not reach their mobile phones. For example, the users may leave their mobile phones at home when they go to work. Or the users may leave their mobile phones at their offices when they go home. As a result of that, the users will not be able to receive calls or messages through short message services (SMS) directed to them. The problem is even more visible for businesspersons because missing calls may mean missing of business opportunities. In addition, any user who is in these situations would feel inconvenient.

One easy way for mobile phone users to overcome the afore-mentioned problem is to travel back and forth to fetch their mobile phone that is left behind. However, the travel spending on the fetch process is a waste of time and, in some cases, costly.

Therefore, there is an imperative need to have a mobile phone that can be remotely commanded to divert calls to designated recipients. This invention satisfies this need by disclosing an algorithm that enables a mobile phone to be commanded to divert calls or messages to designated recipients and methods for making the call diversion. Other advantages of this invention will be apparent with reference to the detailed description.

SUMMARY OF THE INVENTION

The present invention provides a method for remotely directing a mobile phone to divert a phone call or a short message directed to the mobile phone to a designated recipient. The method comprises the following step of: sending a commanding message to the mobile phone, wherein the mobile phone has a registered remote command program with an algorithm that enables the mobile phone to receive and process the commanding message; and wherein the commanding message has a command executable by the remote command program; thereby the mobile phone will divert any phone call or short message for the mobile phone to the designated recipient.

Accordingly, one object of the present invention is to provide mobile phone users convenience by enabling them to remotely command their mobile phones.

The objectives and advantages of the invention will become apparent from the following detailed description of preferred embodiments thereof in connection with the accompanying drawings.

BRIEF DESCRIPTION OF THE DRAWINGS

Preferred embodiments according to the present invention will now be described with reference to the Figures, in which like reference numerals denote like elements.

DETAILED DESCRIPTION OF THE INVENTION

Figure 1:
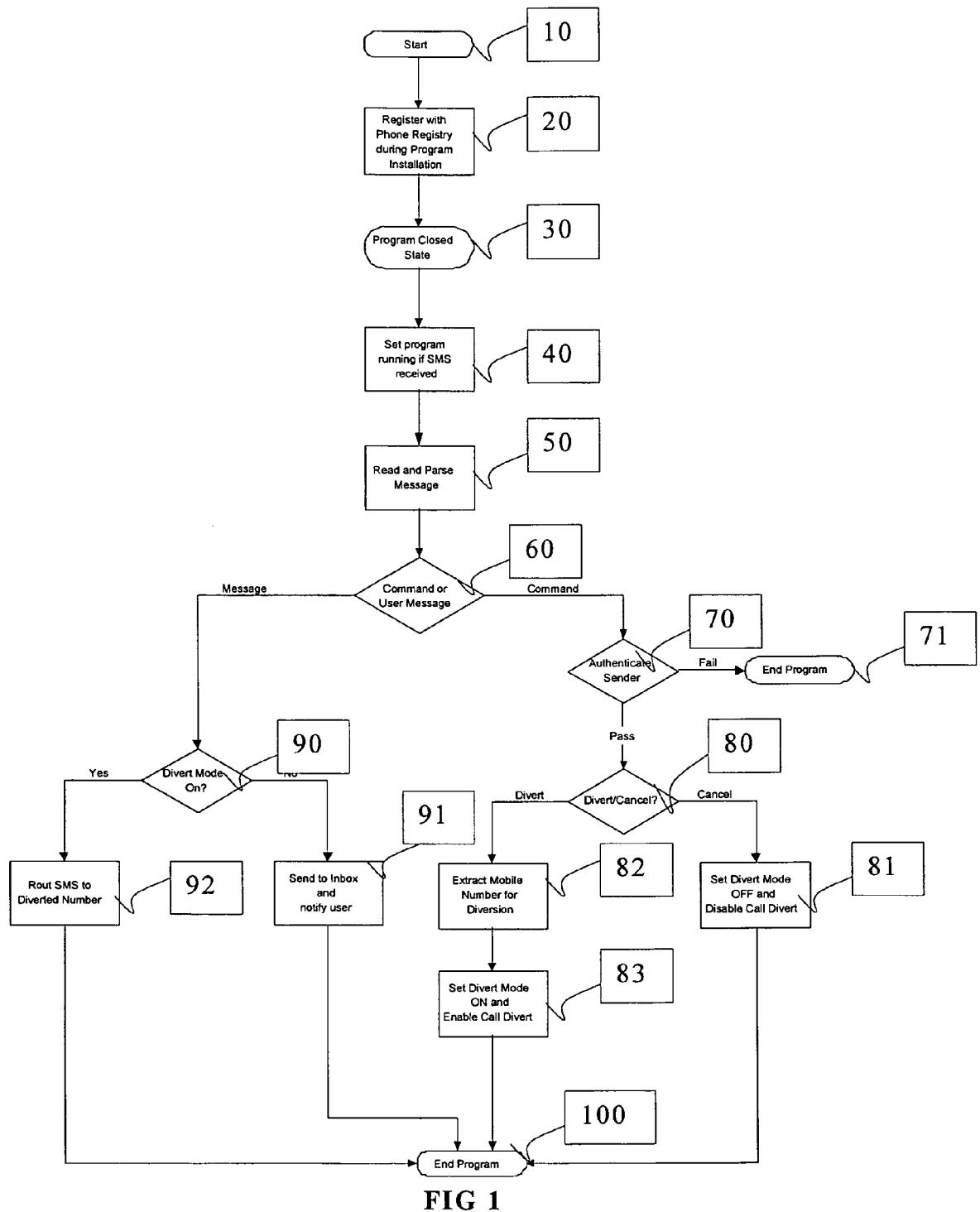
FIG. 1 is a flow chart of remote command of diverting calls or messages directed to a mobile phone.

The present invention may be understood more readily by reference to the following detailed description of certain embodiments of the invention.

Throughout this application, where publications are referenced, the disclosures of these publications are hereby incorporated by reference, in their entireties, into this application in order to more fully describe the state of art to which this invention pertains.

The present invention provides an algorithm that enables a mobile phone user to remotely command his/her mobile phone to divert calls or messages to his/her designated recipient. The algorithm is embedded in a remote command program that is installed in a mobile phone. The remote command program is automatically registered with the phone registry when the program is first installed.

The remote command program may be constitutively active so that the program will receive and process every message without activation. In certain embodiments, the remote command program may remain inactive after the program installation. In this case, the remote command program will be activated by every incoming message so that the message will be retrieved from MessageConnection and the PayLoadText is parsed. In other embodiments, the remote command program will only be activated by a message containing a Command as discussed below.

When a Command is received, the remote command program will authenticate the issuer of the Command. If the issuer cannot be authenticated, the Command will be ignored. If the issuer is authenticated, the remote command program identifies whether the Command is a Divert Command for call diversion or a Cancel Command for cancellation of call diversion. If a Divert Command is received, the remote command program extracts telephone number designated for forwarding the calls or messages, then turns on the Divert Mode, thereby enables the mobile phone to divert calls or messages to the designated telephone number. If a Cancel Command is received, the remote command program will turn off the Divert Mode, thereby disabling further diversion.

When the remote command program is constitutively active, it will receive and process all the messages without being activated. Thereby, when the mobile phone is off of its Divert Mode, all the messages without a Command will be forwarded to Inbox. Of course, all incoming calls will not be diverted. If the mobile phone receives a message with a Divert Command, the Divert Mode will be on, then diverting all incoming calls or messages to the designated number.

When the remote command program is to be activated by every message, it will receive and process all the messages after it is activated. When the mobile phone is off of its Divert Mode, all the messages without a Divert Command will be forwarded to Inbox. Of course, all incoming calls will not be diverted. If the mobile phone receives a message with a Divert Command, the Divert Mode will be on, then diverting all incoming calls or messages to a designated number.

When the remote command program can only be activated by a message embedded with a Command, all the messages without a Command will be forwarded to Inbox without activating the remote command program if the mobile phone is off of its Divert Mode. Of course, all incoming calls will not be diverted. If the Divert Mode is on, the mobile phone will divert all incoming calls or messages to designated number.

While the discussion describes that all the incoming calls and messages will be diverted to a designated number, it is to be appreciated that the remote command program may allow a subset of calls or messages to be diverted to a designated number. The subset numbers can be provided by the commanding message or stored in the mobile phone. In addition, the remote command program may allow different subsets of calls or messages to be diverted to different designated numbers.

Referring now to FIG. 1, a more detailed description is provided for one preferred embodiment of diverting calls or messages in accordance with the present invention. In step 10, a mobile phone is turned on. During the program installation in step 20 when the mobile phone starts, a remote command program embedded with an algorithm for diverting calls or messages is registered with phone registry. Then, the remote command program is closed, staying in an inactive state as shown in step 30. Now the mobile phone is ready for receiving and processing commands embedded in messages.

In step 40, when a message is received by the mobile phone, the message will activate the remote command program to set the program running. Then, the activated program will read and parse the message in step 50. Then, the program will check whether the message contains a Command or not in step 60.

When a message having a Command is received, the program will authenticate the sender in step 70. If the authentication fails, the program ends in step 71. If the authentication passes, the program will identify the Command as either Divert Command or Cancel Command in step 80. When a Cancel Command is received, the Command will set Divert Mode off and disable further diversion of calls or messages in step 81. Of course, if the Divert Mode is off already, the Divert Mode will remain off. The running of the program ends in step 100 and the program returns to step 30.

When a Divert Command is received, the program will extract from the message the phone number designated for call diversion in step 82. At the same time, the program will turn on the Divert Mode in the mobile phone and enable the mobile phone to divert all incoming calls or messages to the designated phone number in step 83. In certain embodiments, the programs for enabling and disabling call divert are similar to the ones calling a function that toggles the divert function found in most or all mobile phones. When the Divert Mode is on, another message having a Divert Command with a different designated phone number will substitute the existing number with the new number. Thereby a mobile phone user may divert calls or messages to any designated number he/she prefers. In addition, the commanding message may specify the duration when the Divert Mode will be on. At the expiration of the duration, the Divert Mode will be automatically switched off. The running of the program ends in step 100 and the program returns to step 30.

When a message without a Command is received, the fate of the message will depend on whether the Divert Mode is on or off in step 90. If the Divert Mode is off, the message will be sent to Inbox of the mobile phone in step 91. Then, the running of the program ends in step 100 and the program returns to step 30. If the Divert Mode is on, the message will be sent to the designated number in step 92. Then, the running of the program ends in step 100 and the program returns to step 30.

One illustrative pseudocode for the remote command algorithm is described hereinbelow:

```
Installation of RemoteCommand program onto phone
Set program to listen to incoming messages
For each SMS received
{
    Parse message
    If Command is received
        Authenticate issuer
        If Divert command received
            Extract number for designated recipient
            Activate call divert to rout calls to extracted number
            Set Divert mode on to rout any future SMS received
        else if Cancel command received
            Deactivate phone's call divert feature
            Set Divert mode off for SMS
        Endif
    Endif
    If Message is received
        If Divert mode on received
            Send out received SMS to diverted number
        else
            Forward message to phone's Inbox
        Endif
    Endif
}
```

It is appreciated that any mobile phone can be installed with the remote command program. The Command message can be sent to the mobile phone by any suitable device including another mobile phone, a web-based inputting device, a landline phone, and any portable electronic devices that can send short messages. The recipient for the diverted calls or messages may be any suitable device including another mobile phone, a landline phone, a PC, and any portable electronic devices that can receive phone calls and/or short messages.

While the present invention has been described with reference to particular embodiments, it will be understood that the embodiments are illustrative and that the invention scope is not so limited. Alternative embodiments of the present invention will become apparent to those having ordinary skill in the art to which the present invention pertains. Such alternate embodiments are considered to be encompassed within the spirit and scope of the present invention. Accordingly, the scope of the present invention is described by the appended claims and is supported by the foregoing description.

What is claimed is:

1. A method for remotely directing a mobile phone to divert a phone call or a short message service (SMS) message intended for the mobile phone to a designated recipient, comprising the following step of:

sending a SMS message to the mobile phone, wherein the mobile phone has a registered remote command program with an algorithm that enables the mobile phone to receive and process the SMS message, wherein the SMS message having a command therein; and executing the command on the mobile phone by the remote command program to activate/deactivate call divert on the mobile phone to divert any phone call or SMS message for the mobile phone to the designated recipient.

2. The method of claim 1, wherein the designated recipient is one selected from the group consisting of another mobile phone, a landline phone, a PC, a Notebook, and a portable device capable of receiving the phone call and message.

3. The method of claim 1, wherein the commanding message may be one provided by short message service.

4. The method of claim 1, wherein the short message service provider may be a mobile phone, a PC, a Notebook, or a portable device capable of sending a short message.

5. The method of claim 1, wherein the registered algorithm comprising the steps of:

```
installing the registered remote command program onto the mobile phone;
listening to incoming messages;
parsing the incoming message;
when the incoming message contain a command,
    authenticating issuer;
        if the command is a divert command,
            extracting number for designated recipient;
            activating call divert to divert calls to the extracted number;
            setting divert mode on to divert subsequent messages
                received;
        if the command is a cancel command,
            deactivating call divert;
            setting the divert mode off;
when message does not contain a command,
    if the divert mode is set on,
        sending out the message to the extracted number;
    if the divert mode is set off,
        forwarding the message to an inbox of the mobile phone.
```

6. An algorithm for enabling a mobile phone to remotely receive and process a commanding message so that any phone call or message sent to the mobile phone will be forwarded to a recipient designated by the commanding message, comprising the steps of:

```
installing a registered remote command program onto the mobile phone;
listening to incoming messages;
parsing the incoming messages;
when the incoming message is the commanding message,
    authenticating issuer;
    if the commanding message contains a divert command,
        extracting number for the designated recipient;
        activating call divert to divert calls to the extracted number;
        setting divert mode on to divert subsequent messages received;
    if the commanding message contains a cancel command,
        deactivating call divert;
        setting the divert mode off;
when the incoming messages is not the commanding message,
    if the divert mode is set on,
        sending out the incoming message to the extracted number;
    if the divert mode is set off,
        forwarding the incoming message to an inbox of the mobile phone.
```

7. A mobile phone that can be remotely commanded to divert calls or messages to a designated recipient, comprising a call diversion algorithm, wherein the algorithm is a pseudocode comprising the steps of:

```
installing a registered remote command program onto the mobile phone;
listening to incoming messages;
parsing the incoming messages;
when the incoming message is the commanding message,
    authenticating issuer;
    if the commanding message contains a divert command,
        extracting number for the designated recipient;
        activating call divert to divert calls to the extracted number;
        setting divert mode on to divert subsequent messages received;
    if the commanding message contains a cancel command,
        deactivating call divert;
        setting the divert mode off;
when the incoming messages is not the commanding message,
    if the divert mode is set on,
        sending out the incoming message to the extracted number;
    if the divert mode is set off,
        forwarding the incoming message to an inbox of the mobile phone.
```

* * * * *